(12) United States Patent
Kelly

(10) Patent No.: US 12,699,032 B1
(45) Date of Patent: Aug. 4, 2026

(54) LOAD TEST APPARATUS WITH INTEGRATED THERMAL CONDITIONING

(71) Applicant: United Launch Alliance, L.L.C., Centennial, CO (US)

(72) Inventor: Christopher Sheridan Kelly, Colorado Springs, CO (US)

(73) Assignee: UNITED LAUNCH ALLIANCE, L.L.C., Centennial, CO (US)

( * ) Notice: Subject to any disclaimer, the term of this patent is extended or adjusted under 35 U.S.C. 154(b) by 787 days.

(21) Appl. No.: 17/965,047

(22) Filed: Oct. 13, 2022

(51) Int. Cl.
*G01N 3/60* (2006.01)

(52) U.S. Cl.
CPC ....... *G01N 3/60* (2013.01); *G01N 2203/0017* (2013.01); *G01N 2203/0019* (2013.01)

(58) Field of Classification Search
None
See application file for complete search history.

(56) References Cited

U.S. PATENT DOCUMENTS

| | | | |
|---|---|---|---|
| 5,318,361 A | 6/1994 | Chase et al. | |
| 5,942,682 A | 8/1999 | Ghetzler et al. | |

5,980,103 A  11/1999  Ikuno et al.
9,164,050 B2  10/2015  Davies
9,417,137 B2  8/2016  Johnson et al.
2018/0125702 A1*  5/2018  Roth ....................... A61F 7/007

FOREIGN PATENT DOCUMENTS

| | | |
|---|---|---|
| JP | 6234756 | 11/2017 |
| KR | 101834655 | 3/2018 |
| RU | 91623 | 2/2010 |
| WO | WO 86/05552 | 9/1986 |
| WO | WO 2020/096477 | 5/2020 |

OTHER PUBLICATIONS

Ling et al. "Deformation response of EPS foam under combined compression-shear loading. Part II: High strain rate dynamic tests," International Journal of Mechanical Sciences, 2018, 51 pages.

* cited by examiner

*Primary Examiner* — Erica S Lin
(74) *Attorney, Agent, or Firm* — Sheridan Ross P.C.

(57) ABSTRACT

A system and method for conducting thermal condition testing on a test object or objects where a first test fixture in contact with a test object has a first temperature and a second test fixture in contact with the test object has a second temperature. The test object or objects may also be secured to the text fixtures which permits a force or load placed on one or both test fixtures to be applied to the test object or objects while subjected to a temperature gradient from the test fixtures. The applied force or load may be tensile of compressive.

20 Claims, 7 Drawing Sheets

LOAD TEST APPARATUS WITH
INTEGRATED THERMAL CONDITIONING

FIELD OF INVENTION

This disclosure relates to an apparatus and method for testing objects under varying thermal conditions, including but not limited to extreme temperature differentials, and also subjecting the testing objects to tensile or compressive loads simultaneous with applying thermal conditions.

BACKGROUND

Test apparatus exist that apply a thermal load to a component or test object. For example, U.S. Pat. No. 5,980,103 describes a test apparatus for analyzing the thermal fatigue of component. A test piece is placed between two holders with thermal expansion coefficients different from the coefficient of the test piece. The test unit is cyclically heated and cooled. The difference in the thermal expansion coefficient between the test piece and the holder is used to cause a strain on the test piece. U.S. Pat. No. 5,318,361 also discloses a device for thermal stress testing. A test piece is connected to one side of a heat sink which, in turn, is coupled to a second, larger heat sink. The temperature of the device is rapidly cycled between hot and cold to produce a thermal shock on a test object. U.S. Pat. No. 9,164,050 discloses a thermal shroud applied to all or a portion of a test object, such as aircraft structure, to permit the test object to be heated or cooled and subject to a load without external environmental conditions effecting the test.

A problem with test apparatus such as those described above is the inability to simultaneous apply hot and cold temperature conditions to physically proximate areas of a test object while also applying a tensile or compressive load to the test object.

SUMMARY

A first aspect of the present disclosure provides a thermal test apparatus that is capable of simultaneous application of two different temperatures to different portions of a test object that provides the ability to characterize the heat transfer and thermal conductivity of the test object in varying thermal conditions. In a second aspect of the present disclosure a thermal test apparatus provides the ability to characterize the heat transfer and thermal conductivity properties of the test object under varying test loads or forces. As a material is put in tension or compression the resulting stresses on the material may compress surface incontinuity and/or internal voids reducing the insulative properties of the material. Thus, the test setup can derive the difference in thermal properties in multiple thermal states and in multiple load states. The test object may be a single component or multiple components that function in unison.

In the context of a launch vehicle, structural objects may be exposed to a wide range of environmental conditions including simultaneous exposure to hot and cold temperatures. For example, for a launch vehicle positioned on a launch pad, a propellant tank may contain a liquid cryogen propellant at a temperature of approximately –423° F. while the ambient temperature on the launch pad is 70-90° F. As a result, one or more components may simultaneously experience an extreme temperature differential. One example is mounting brackets securing a cryogenic propellant tank to the superstructure of the launch vehicle. Similarly, in space, the sun-facing surface of the International Space Station (ISS) can reach temperatures of approximately 250° F. while the opposite or dark side can reach temperatures of approximately –250° F. Thus, some structures or components of the ISS may be simultaneously exposed to significant temperature differentials. A similar temperature differential is exhibited by components that receive radiative or conductive heating from thrusters, engines, or other combustion devices at temperatures of 450° F. or greater. The mechanical connection of these devices to a launch vehicle structure that is in contact with cryogenic liquids down to –423° F. necessitates a test mechanism that can simulate the thermal gradient as well as the structural loads simultaneously.

In one embodiment of a test apparatus according to the present disclosure, a test apparatus may comprise two separate thermal test fixtures each configured to apply a predetermined temperature to a test object. One or both test fixtures may include internal passageways in which fluid flows. The fixture will approximate the temperature of the fluid through conductive heat transfer. Varying the temperature of the fluid varies the temperature of the test fixture. As a result, flowing a liquified coolant gas, such as a liquid cryogen, through the passageway reduces the temperature of a test fixture. Similarly, supplying a warmed or heated fluid through the internal passageways of a test fixture increases the temperature of a test fixture. Alternatively, the test fixtures may be heated or cooled by external devices. In one embodiment, an external heater in contact with a test fixture may be used to heat a text fixture instead of or in addition to the use of a heated fluid. Similarly, an external coolant or refrigerant may be used to cool the temperature of a test fixture. In one embodiment, a source of heating or cooling may be positioned relative a test fixture to provide conductive heat transfer. As a result, a significant temperature differential may be applied to a test object in contact with the two test fixtures. In one example, one test fixture may provide cold temperatures and one test fixture provide warm or hot temperatures. One skilled in the art will appreciate upon review of the present disclosure that the test apparatus may include more than two test fixtures where multiple test fixtures have the same or similar temperatures.

In a second embodiment of a test apparatus according to the present disclosure, the test fixtures may be configured to support attaching mechanisms that permit tensile or compressive forces to be applied to the test object or objects via the test fixtures. In one example, one test fixture may be provided with mounting structure that allows the test fixture to be secured to a rigid or immovable external element or object and the other test fixture provided with an attachment mechanism that allows a tensile or compressive force to be applied. The mounting structure may be an aperture, a threaded aperture, a post, a threaded post, a hook or any other mechanism known to those of skill in the art through which the test fixtures may be subjected to an external force or load that is transmitted to the test object or objects. As a result, with a test object secured to the two test fixtures, the test object or objects may be subjected to a tensile or compressive load while simultaneously subjected to thermal conditioning.

Either or both the load and the thermal conditioning may be varied during testing. For example, the test object or objects may be subjected to a temperature differential or gradient via the two test fixtures while the applied load is varied and the temperature differential held constant. Alternatively, the applied force may be held constant and the temperature differential varied. Further still, both the temperature differential and the applied force may be varied during testing. The variability allows the test apparatus to mimic actual conditions that an object may be subjected to during use, for example, through the launch process of a launch vehicle.

A further aspect of the present disclosure provides an insulative blanket or cocoon to envelop and isolate one of the test fixtures from the other test fixture to control test conditions and prevent or reduce the temperature of one test fixture from adversely influencing the temperature of the second test fixture and also to isolate the insulated test fixture from surrounding ambient conditions.

A still further aspect of the present disclosure implements a controlled input of liquified coolant gas inside the insulative blanket. The liquid coolant rapidly heats ("boils off") and displaces atmospheric moisture to reduce or eliminate icing of the test fixture and test object. In one example, small pores in the liquid passageway of the test fixture can be used to control the volume of liquified coolant gas leaking from a test fixture. In a second example, a throttle valve may be used to controllably release a desired amount of liquified coolant gas or inert purge gas.

In another aspect of the present disclosure, each test fixture includes an interface surface that physically contacts at least one surface of the test object for purposes of conductive thermal transfer. In one embodiment, the interface surface may be a flat surface. In other embodiments, the interface surface may be contoured to mimic a surface of the test object and to increase surface to surface contact between the test fixture and the test object.

The two test fixtures are also configured with mechanisms to secure a test object or test objects to the test fixture. Such mechanisms may include, for example, threaded bores to receive complementary threaded bolts whereby a surface of the test object is secured to the interface surface of the test fixture. Clamps and other attachment mechanisms known to those of skill in the art that do not inhibit conductive thermal transfer and secure the test object to the test fixture will become known to those of skill in the art upon review of the present disclosure and are deemed to be within the scope of this disclosure.

According to other aspects of the present disclosure, the test fixtures may also be configured to vary the orientation of the interface surface of one fixture relative to the other. For example, the orientation of the interface surfaces may be parallel in one test or one interface surface may be oriented at an angle relative to the second interface surface of the other test fixture to accurately correspond to the orientation of the test object during actual use. In addition, the location and configuration of the attachment mechanisms relative to the interface surfaces may be arranged or configured such that the force or load applied via the attachment mechanisms is at an angle relative to the interface surfaces such that the applied load or force is not parallel to the force securing the test object to the test fixture.

In another aspect of the present disclosure, one or more valves may be disposed along the length of the fluid passageway within a test fixture to alter the length or volume of the passageway that receives the cold or hot fluid. This, in turn, allows the physical area of the interface surface subjected to heating or cooling to be enlarged or reduced in area. Such flexibility or variability allows the area of the interface surface of the test fixture that is subjected to cooling or heating to match differently sized test objects and to size the area of the interface surface to match that of the test object and thereby isolate the heating and/or cooling of the test fixture from adjacent portions of the test object.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to the present disclosure or aspects thereof should be understood to mean certain embodiments of the present invention and should not necessarily be construed as limiting all embodiments to a particular description. The present disclosure provides various levels of detail and no limitation as to the scope of the claimed invention is intended by either the inclusion or non-inclusion of elements, components, etc. in this Summary of the Invention.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the exemplary claims set forth herein, taken in conjunction with this Summary of the Invention, define the invention.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and, together with the general description of the invention given above and the detailed description of the drawings given below, serve to explain the principles of the invention.

The drawings are not necessarily to scale and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
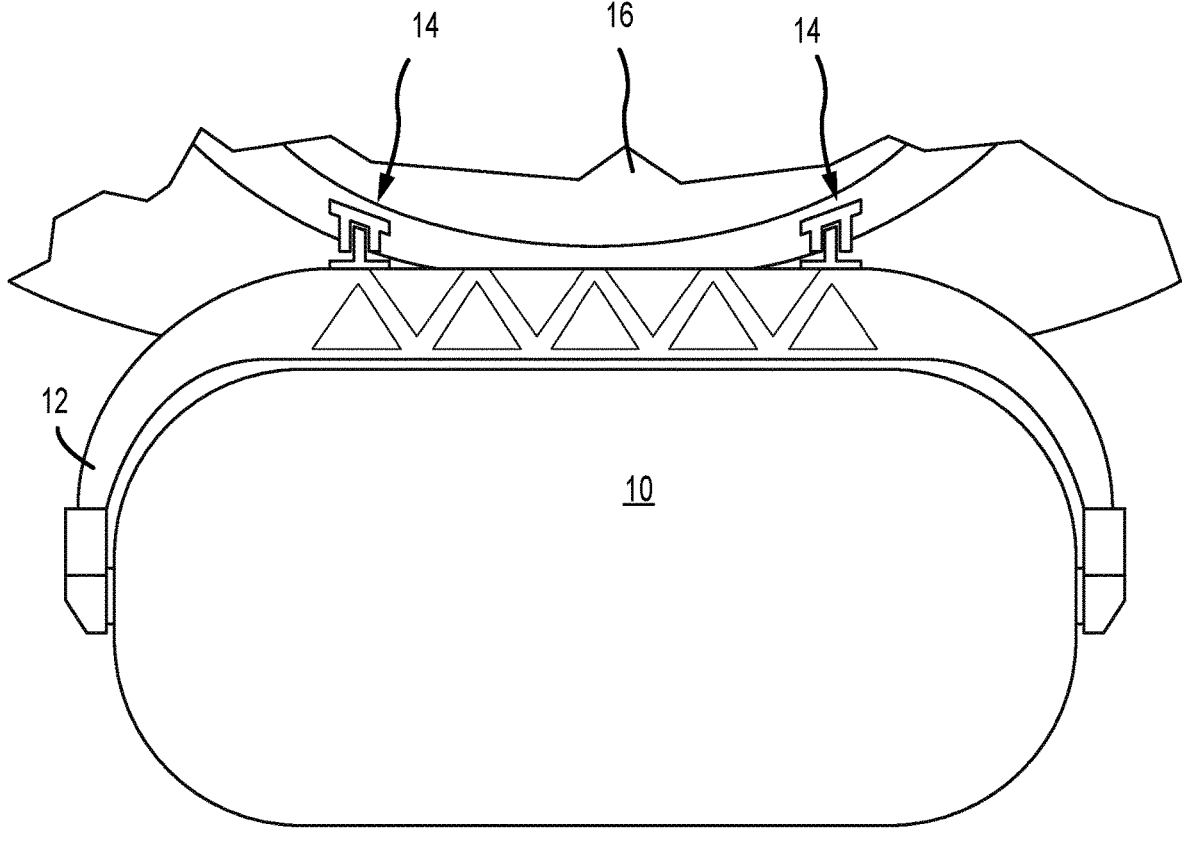
FIG. 1 is a partial plan view of a cryogenic propellant storage tank with an ambient temperature gaseous storage vessel connected to the propellant tank of a launch vehicle.

With reference to FIG. 1, an ambient temperature gaseous storage tank 10 is shown connected to a liquid cryogen propellant tank 16 of a launch vehicle. More specifically, a C-shaped bracket 12 is connected to opposite ends of the tank 10 and the C-shaped bracket 12 is connected to the cryogenic propellant tank 16 by a two piece clevis bracket and pin 14. As previously noted, liquid cryogens have a temperature of approximately −423° F. If the launch vehicle is positioned on a launch pad prior to launch, for example at Cape Canaveral, Florida, the surrounding or ambient air and that gaseous storage tank 10 may be at a temperature of +70-90° F. Thus, the clevis bracket 14, as well as other proximately located structures, may be exposed to a large temperature differential. It is desirable, therefore, to be able to test the clevis bracket, and other test objects, under conditions where the test objects are subjected to large or significant temperature differentials consistent with actual use of the test object.

Figure 2:
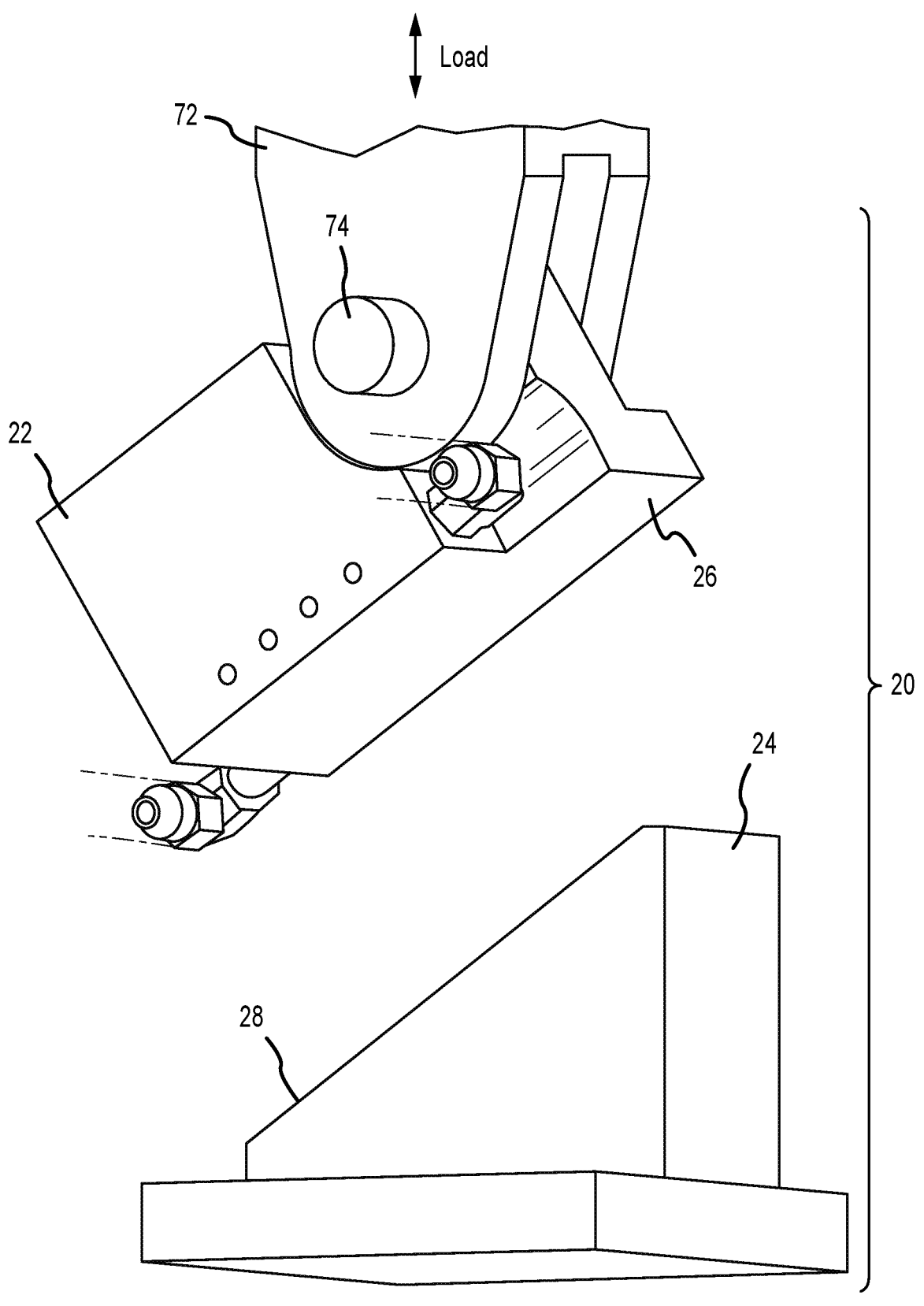
FIG. 2 is a perspective view of one embodiment of a test apparatus according to the present disclosure.

FIG. 2 is a perspective view of one embodiment of a load test apparatus with integrated thermal conditioning 20 according to the present disclosure. The test apparatus 20 includes a first test fixture 22 and a second test fixture 24. The first test fixture includes a first interface surface 26 configured to contact and interface with a first surface of a test object. Similarly, the second test fixture 24 includes a second test surface 28 configured to contact and interface with a second surface of the first test object or, if the test object comprises multiple pieces, with a second surface of a second test object. It will be appreciated by those of skill in the art upon review of the present disclosure, that a test object may be a single component or multiple components. It should also be appreciated that the test apparatus 10 may comprise more than two test fixtures depending upon the nature of the object to be tested.

As also illustrated in FIG. 2, the first test interface surface 26 and second test interface surface 28 are parallel to each other and oriented at an angle relative to horizontal or vertical. It should be appreciated that the test interface surfaces 26 and 28 may be oriented at any angle, relative to each other or to horizontal or vertical, that mimics actual use conditions of the object(s) to be tested.

Figure 3:
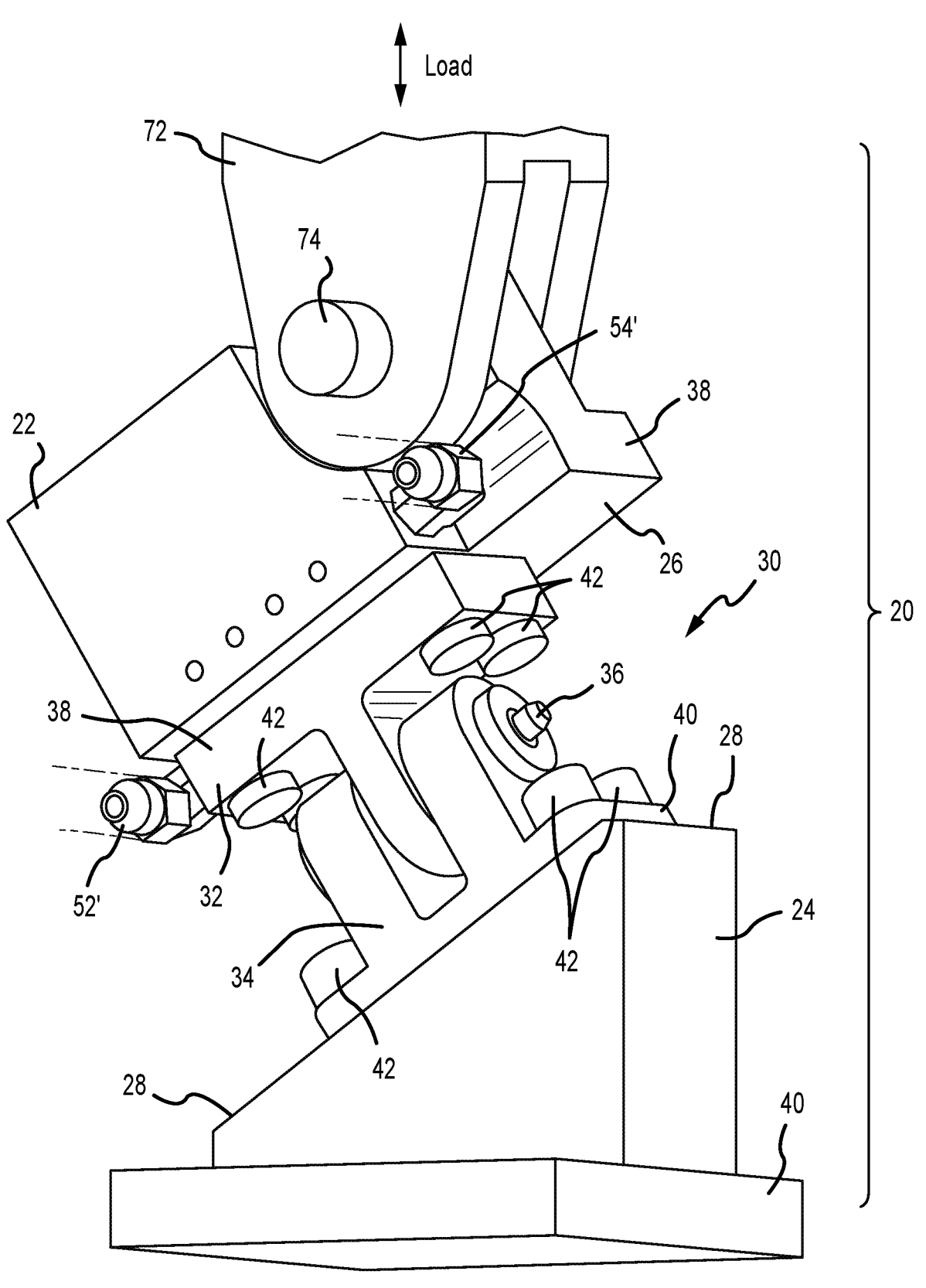
FIG. 3 is a perspective view of the embodiment of FIG. 2, further including a multipiece test object.
Figure 4:
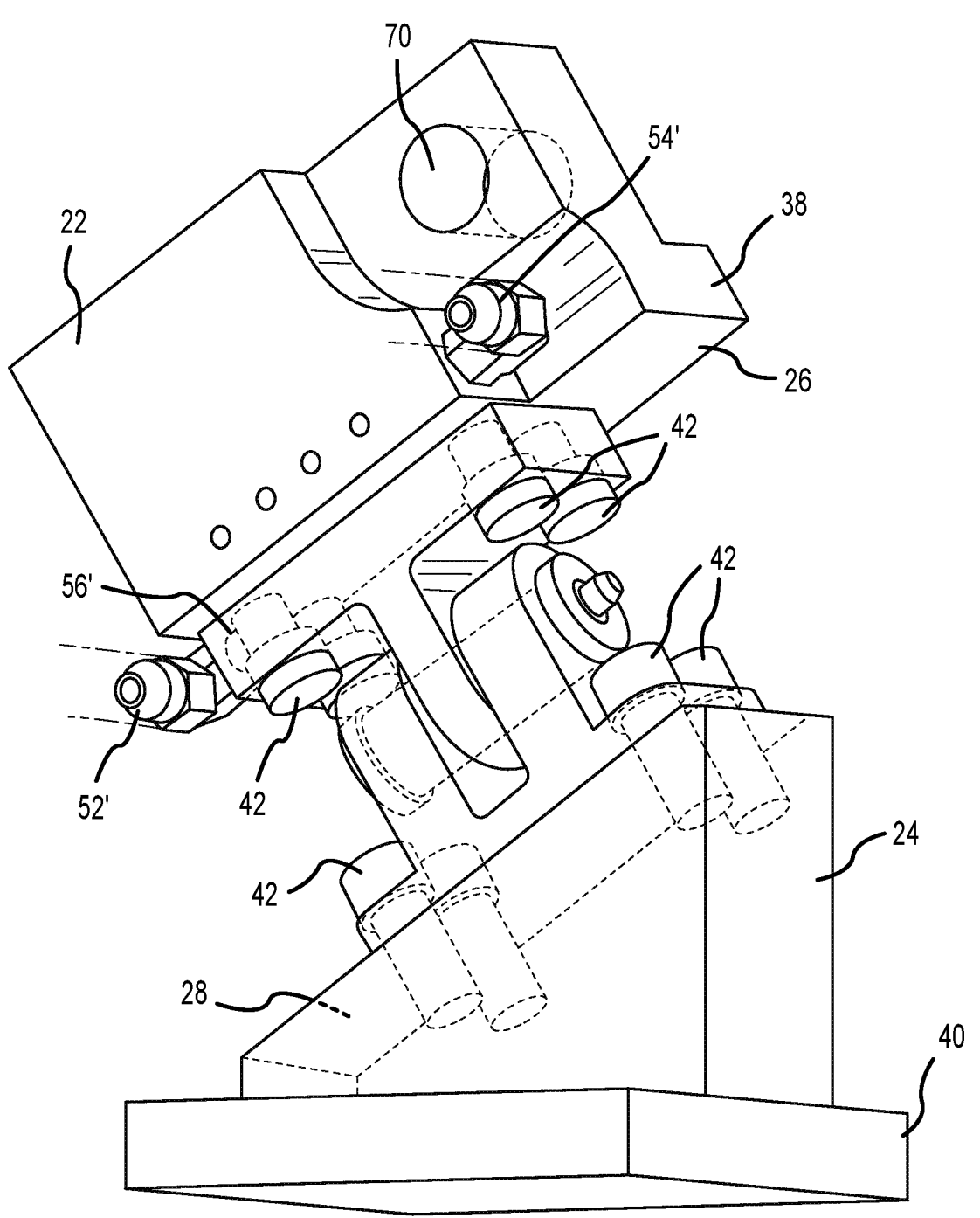
FIG. 4 is a perspective view of the embodiment of FIG. 3, further illustrating methods for affixing the test object to the test fixture.

Turning to FIG. 3, a test object 30 is positioned in contact with and between the first interface surface 26 and second interface surface 28. Here, the test object 30 is a clevis joint having a first bracket 32 with two yokes and a second bracket 34 with a single yoke. A pin 36 allows the brackets to pivot with respect to one another. As shown, the base 38 of the first bracket 32 contacts the first interface surface 26 and the base 40 of the second bracket 34 contacts the second interface surface 28. With reference to FIGS. 3 and 4, bolts 42 may be used to secure the first and second brackets 32 and 34 to the first and second test fixtures 22 and 24, respectively. Although not shown in detail, those of skill in the art will appreciate that threaded bores may be formed in the first and second test fixtures 22 and 24 to receive threaded bolts 42 that extend through apertures in the first and second test objects 32 and 34. Those of skill in the art will further understand that other known methods of attaching or affixing a test object to the first and second interface surfaces 26 and 28 may be used in place of the bolts 42 and are deemed to be substitutable for the bolts 42 and within the scope of the present disclosure.

Figure 5:
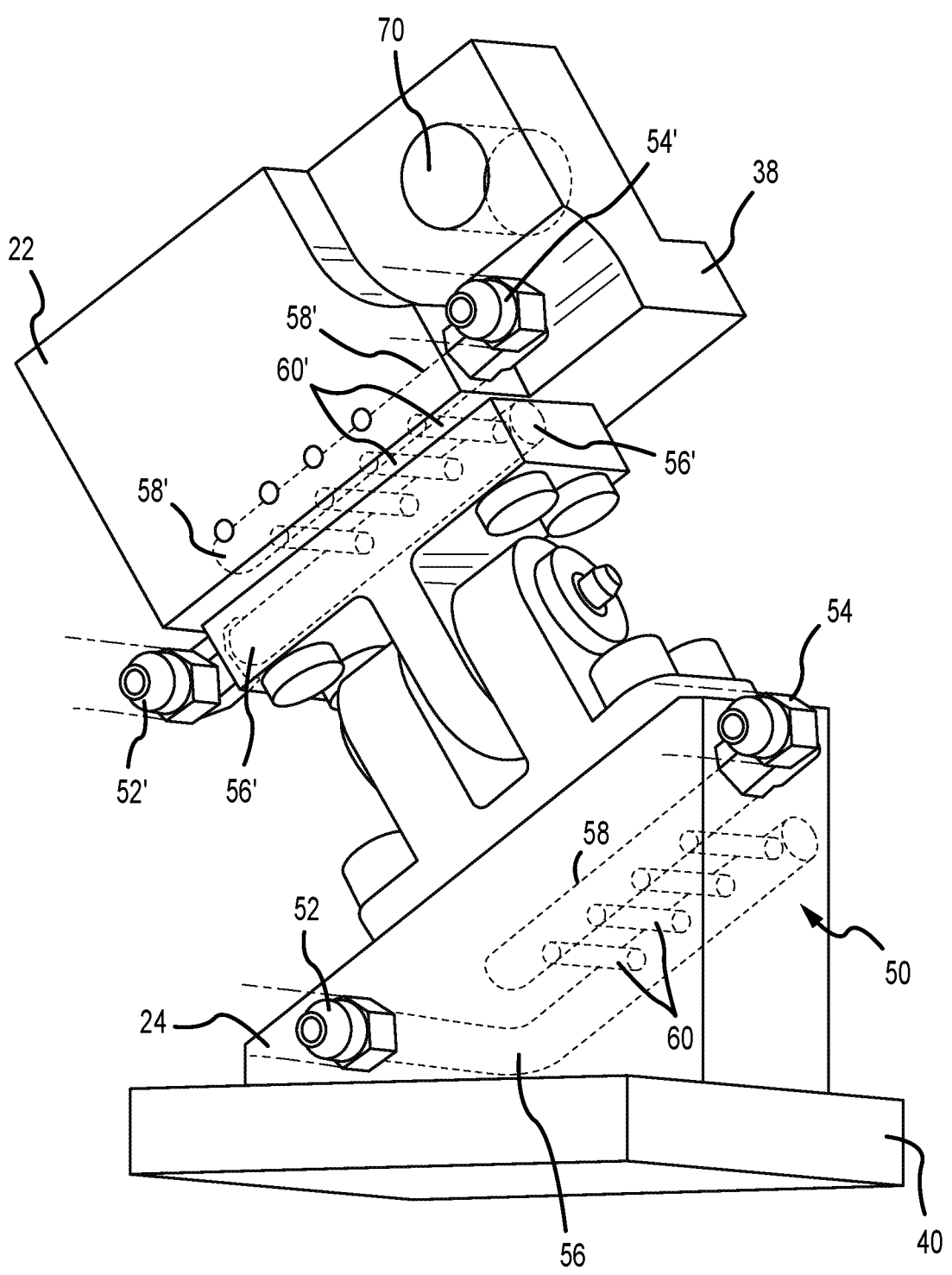
FIG. 5 is a perspective view of a second embodiment of the test apparatus according to the present disclosure illustrating fluid passageways in both test fixtures.

With reference to FIG. 5, internal fluid passageways are formed in both test fixtures 22 and 24. First and second fluid fittings 52 and 54 are shown on the exterior of the test fixture 24. A first fluid passageway 56 extends from and is fluidly connected to the first fitting 52. A second fluid passageway 58 extends from and is fluidly connected to the second fitting 54. The first and second fluid passageways 56 and 58 are interconnected by linking passageways 60. A fluid introduced at either the first or second fitting 52 and 54 will flow through the test fixture 24 and exit at the opposite fitting. Test fixture 22 similarly includes external fittings 52' and 54', first and second fluid passageways 56' and 58' and linking passageways 60'. A fluid may be circulated through either or both test fixtures. It should be appreciated that a fluid passageway may be included in only one of the test fixtures 22 and 24 or in both.

The temperature of the circulated fluid may be cold, e.g., at a temperature of a liquid cryogen (approximately −423° F.), or hot, e.g., the temperature of an object in space directly facing the Sun (approximately +250° F.), or anything in between or in excess of these temperatures depending upon the test conditions to be utilized. The configuration and shape of the passageways may also be different than that shown in the figures. Further, a test fixture may include two or more separate passageway systems, not fluidly connected to each other. The separate passageways may be positioned within adjacent portions of the same test fixture proximate to the interface surface, to provide varying temperatures to adjacent portions of the same interface surface as may be needed to replicate actual conditions which the test object is subject to. Alternatively, a single test fixture may have two or more separate interface surfaces configured to contact a test object at more than one location. A single fluid passageway system may be located or routed proximate each interface surface to create a common temperature at each surface or, separate fluid passageway systems may be positioned proximate each interface surface to deliver varying temperatures to each surface.

A further feature illustrated in FIGS. 4 and 5 is an aperture or bore 70 formed in the upper test fixture 22. A yoke or clevis connector 72 may be secured to the fixture 22 with a pin 74 passing through the aperture 70 as illustrated in FIGS. 2 and 3. With the lower fixture 24 affixed to a secure structure or external element, a tensile load may be applied a test object simultaneous with the application of thermal test conditions to further simulate actual or theoretical conditions to which the test object may be subjected. Alternatively, a compressive load may be applied to the test fixture 22 to place the test object(s) in compression. The location of the bore 70 and the orientation of the first and second interface surfaces may be changed to reflect actual conditions. For example, the interface surfaces 26 and 28 may be oriented horizontally and the bore 70 moved to the center of the test fixture 22. In other words, the load may be applied to the test object in a direction that is not parallel to the force applied by the bolts 42 affixing the test object to the test fixture.

Figure 6:
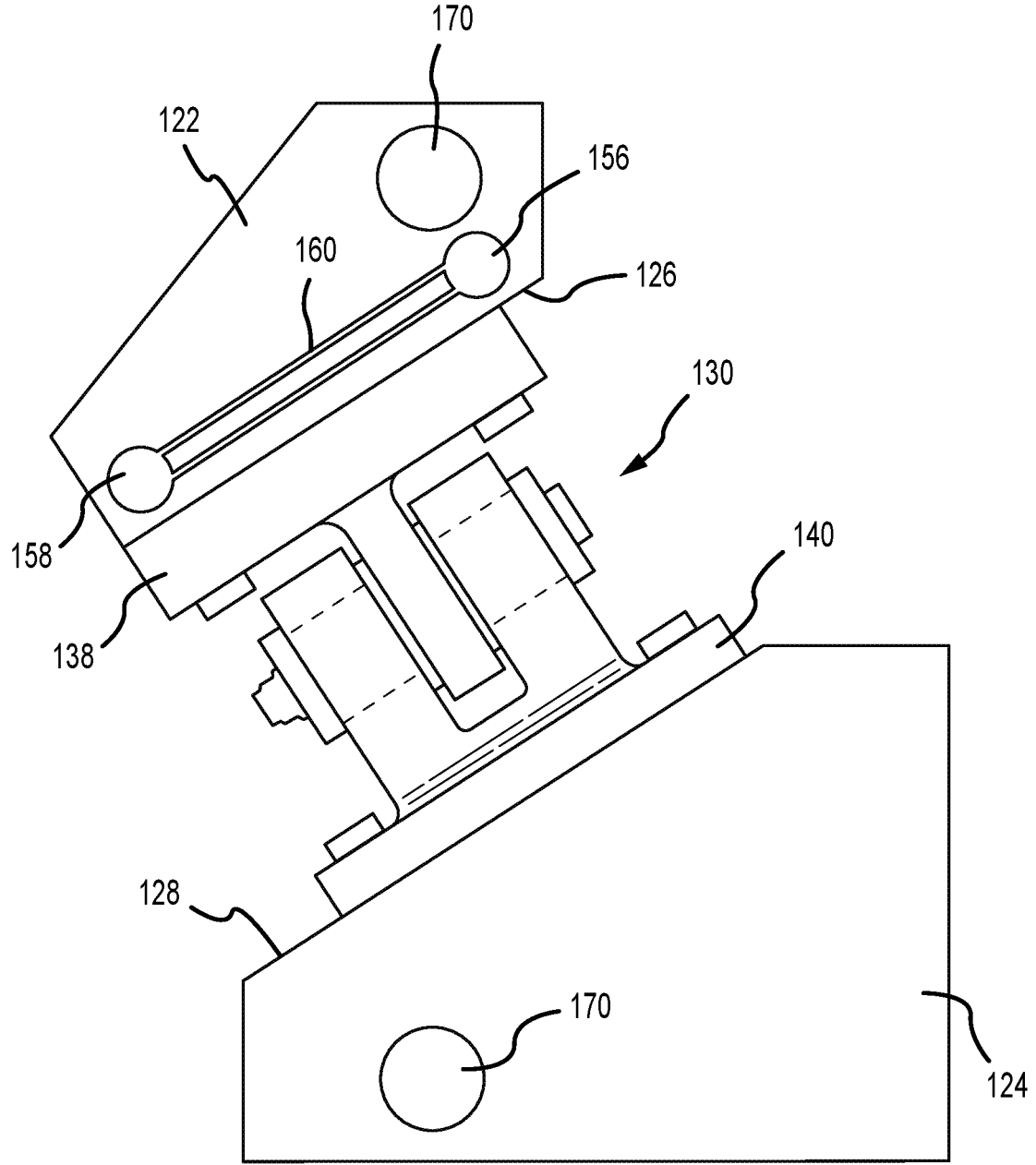
FIG. 6 is a perspective view of third embodiment of a test apparatus according to the present disclosure.

FIG. 6 illustrates a further alternative embodiment of a test apparatus according to the present disclosure. Here, both test fixtures 122 and 124 include an aperture 170 to which a yoke or clevis connector may be affixed for application of a tensile load to the test object. It will be appreciated by those of skill in the art that the location of the aperture 170 may be moved relative to the test fixtures to alter the orientation of the application of the load applied to the test object 130. It will be further appreciated that the orientation of the interface surfaces 126 and 128 may be reoriented to be at any angle relative to each other and to horizontal. Here the test object comprises two components and each component has a base 138 and 140 in contact with the interface surfaces 126 and 128, respectively. A fluid passageway system also is illustrated in test fixture 122, including fluid passageways 156 and 158 and linking passageways 160.

Figure 7:
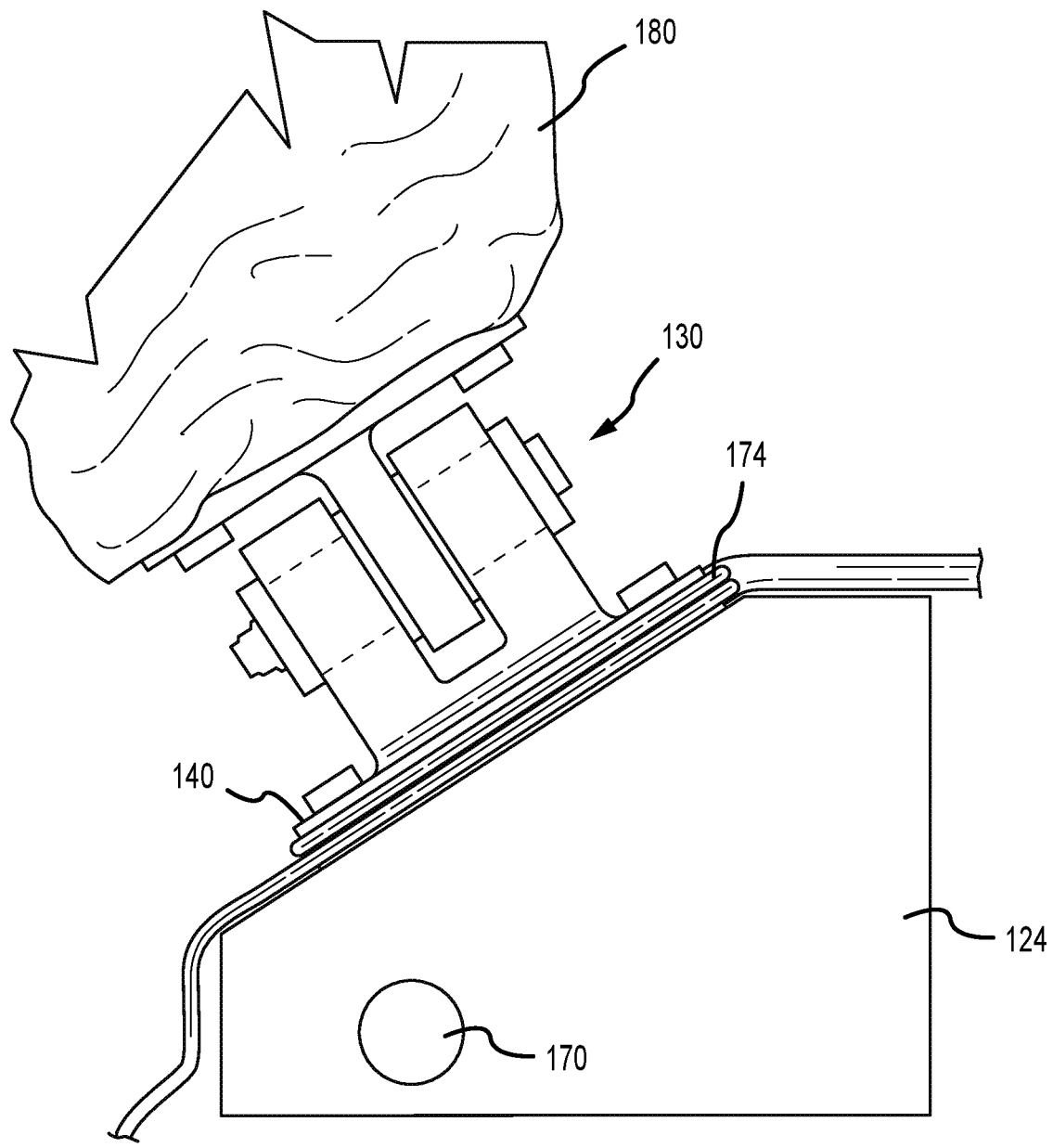
FIG. 7 is a perspective view of a third embodiment of the test apparatus according to the present disclosure.

Turning to FIG. 7, a further embodiment of a test apparatus according to the present disclosure is illustrated. In this embodiment, an insulating layer 180 envelopes the upper test fixture 22 (not seen) in order to isolate the test fixture 22 from surrounding ambient conditions and prevent or reduce the temperature of one test fixture from adversely influencing the temperature of the second test fixture. A insulating envelope will facilitate maintaining a consistent testing temperature for the shrouded test fixture. It should be appreciated that both test fixtures 122 and 124 may be covered with insulation.

A still further embodiment according to the present disclosure implements a controlled leakage of liquified coolant gas inside the insulative layer or blanket 180. The escaped super cold liquid rapidly heats ("boils off") and displaces atmospheric moisture to reduce or eliminate icing of the test fixture and test object inside the insulative blanket. Ice formation may skew test results and is not representative of the vacuum of space. In one example, small pores in the liquid passageway of the test fixture can be used to control the volume of liquified coolant gas leaking from a test fixture. In a second example, a throttle valve may be placed in fluid communication with the passageway to controllably release a desired amount of liquified coolant gas. Other methods of controllably leaking coolant that occur to those of skill in the art upon review of this disclosure are also deemed to be within the scope of the present disclosure.

FIG. 7 also shows an external cable 174 wrapped around the base 140 of the second test fixture 124. The cable may be used instead of internal fluid passageways to apply heat to the test fixture 124 and, in turn, to the test object. The heating cable 174 may, alternatively, be wrapped about the first test fixture 122 rather than the second test fixture. Optionally, instead of a heating cable, a hollow tube or conduit may be wrapped about the exterior of one or both test fixtures and fluid circulated with the tube or conduit. Thermal energy may therefore be transferred to the first and/or second test fixtures with an external conduit rather than an internal passageway. Positioning an insulating blanket about the conduit can improve thermal transfer efficiencies.

Accordingly, a person of skill in the art will recognize that test fixtures according to the present disclosure are able to apply constant and variable thermal and load conditions. Temperatures of the test fixture components may be held constant and the applied load varied over time, the applied load may be held constant and the temperature of the test fixture components varied over time, and the temperatures and load may be varied over time simultaneously, alternatively or according to a predetermined sequence.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

The features of the various embodiments described herein are not intended to be mutually exclusive when the nature of those features does not require mutual exclusivity. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by use of the terms or phrases "for example," "such as," "by way of example," "e.g.," and other language commonly understood to indicate that what follows is an example.

What is claimed is:

1. A test apparatus comprising:
a first test fixture, comprising a first body having a first interface surface and a first fluid pathway disposed in the first body proximate the first interface surface, the first fluid pathway configured to receive a first fluid having a first temperature, wherein a first surface of a test object is removably couplable to the first interface surface of the first test fixture when the test object contacts the first interface surface; and
a second test fixture, comprising a second body having a second interface surface, wherein a second surface of the test object is removably couplable to the second interface surface of the second test fixture when the test object contacts the second interface surface,
wherein, when the first surface of the test object is coupled to the first interface surface of the first test fixture and the second surface of the test object is coupled to the second interface surface of the second test fixture, the first test fixture is configured to apply a thermal load supplied by the first fluid having the first temperature to the test object, and
wherein, when the first surface of the test object is coupled to the first interface surface of the first test fixture and the second surface of the test object is coupled to the second interface surface of the second test fixture, at least one of the first test fixture and the second test fixture is configured to apply a tensile load or a compressive load to the test object.

2. The test apparatus of claim 1, further comprising a second fluid pathway associated with the second body, the second fluid pathway configured to receive a second fluid having a second temperature,
wherein, when the first surface of the test object is coupled to the first interface surface of the first test fixture and the second surface of the test object is coupled to the second interface surface of the second test fixture, the second test fixture is configured to apply a thermal load supplied by the second fluid having the second temperature to the test object.

3. The test apparatus of claim 2, wherein the second fluid pathway is disposed in the second body proximate the second interface surface.

4. The test apparatus of claim 2, wherein the first temperature is different from the second temperature.

5. The test apparatus of claim 1, wherein the first and second interface surfaces are flat.

6. The test apparatus of claim 1, further comprising a heating element associated with the second test fixture and configured to heat the second interface surface,
wherein, when the first surface of the test object is coupled to the first interface surface of the first test fixture and the second surface of the test object is coupled to the second interface surface of the second test fixture, the heating of the second interface surface is a thermal load supplied to the test object.

7. The test apparatus of claim 1, further comprising an insulating envelope enclosing at least a portion of the first body.

8. The test apparatus of claim 1, wherein the first surface of the test object is removably couplable to the first interface surface of the first test fixture via a first attachment mechanism associated with the first body, wherein the second surface of the test object is removably couplable to the second interface surface of the second test fixture via a second attachment mechanism associated with the second body,
wherein, when the first surface of the test object is coupled to the first interface surface of the first test fixture and the second surface of the test object is coupled to the second interface surface of the second test fixture, the thermal load is applied to the test object via the first attachment mechanism, and
wherein, when the first surface of the test object is coupled to the first interface surface of the first test fixture and the second surface of the test object is coupled to the second interface surface of the second test fixture, the tensile load or the compressive load is applied to the test object from at least one of the first test fixture via the first attachment mechanism and the second test fixture via the second attachment mechanism.

9. A method of conducting a test on one or more test objects, comprising:
providing a first test fixture having a first body with a first interface surface, and a first fluid pathway disposed within the first body proximate the first interface surface, wherein the first fluid pathway is configured to receive a first fluid having a first temperature;
providing a second test fixture having a second body with a second interface surface;
placing a test object having a first surface and a second surface between the first body and the second body, wherein the first surface of the test object is removably couplable to the first interface surface of the first test fixture when the test object contacts the first interface surface, and wherein the second surface of the test object is removably couplable to the second interface surface of the second test fixture when the test object contacts the second interface surface; and
circulating the first fluid at a first temperature through the first fluid pathway,
wherein, when the first surface of the test object is coupled to the first interface surface of the first test fixture and the second surface of the test object is coupled to the second interface surface of the second test fixture, the first test fixture is configured to apply a thermal load supplied by the first fluid having the first temperature to the test object, and
wherein, when the first surface of the test object is coupled to the first interface surface of the first test fixture and the second surface of the test object is coupled to the second interface surface of the second test fixture, at least one of the first test fixture and the second test fixture is configured to apply a tensile load or a compressive load to the test object.

10. The method of claim 9, further comprising removably coupling the first surface of the test object to the first interface surface of the first test fixture via a first attachment mechanism associated with the first body and removably coupling the second surface of the test object to the second interface surface of the second test fixture via a second attachment mechanism associated with the second body; and when the first surface of the test object is coupled to the first interface surface of the first test fixture and the second surface of the test object is coupled to the second interface surface of the second test fixture, applying the tensile load or the compressive load to the test object from at least one of the first test fixture via the first attachment mechanism and the second test fixture via the second attachment mechanism.

11. The method of claim 10, further comprising varying the first temperature of the first fluid while the tensile load or compressive load is applied.

12. The method of claim 10, further comprising varying the tensile load or the compressive load while the first temperature of the first fluid is maintained constant.

13. The method of claim 10, further comprising varying the first temperature of the first fluid while the tensile load or the compressive load is maintained constant.

14. The method of claim 10, further comprising varying the first temperature of the first fluid and varying the applied tensile load or the applied compressive load.

15. The method of claim 10, wherein applying the tensile load or the compressive load to the test object comprises securing the first test fixture or the second test fixture to a fixed object and applying the tensile load or the compressive load to the other of the first test fixture and second test fixture.

16. The method of claim 9, further comprising providing a second fluid pathway associated with the second body and circulating a second fluid through the second fluid pathway.

17. The method of claim 16, wherein a second temperature of the second fluid is different from the first temperature of the first fluid.

18. The method of claim 10, wherein the tensile load or the compressive load is applied at an angle relative to the first interface surface and the second interface surface.

19. The method of claim 14, further comprising enclosing the first body within an insulating material, wherein the insulating material defines an inner space, and wherein the method further comprises releasing cryogenic liquid into the inner space.

20. The test apparatus of claim 1, wherein the test object is a first test object, wherein a first surface of a second test object is removably couplable to the first interface surface of the first test fixture when the second test object contacts the first interface surface, wherein a second surface of the second test object is removably couplable to the second interface surface of the second test fixture when the second test object contacts the second interface surface, wherein, when the first surface of the first test object is uncoupled from the first interface surface of the first test fixture and the second surface of the first test object is uncoupled from the second interface surface of the second test fixture, the first test object is interchangeable with a second test object, wherein, when the first surface of second the test object is coupled to the first interface surface of the first test fixture and the second surface of the second test object is coupled to the second interface surface of the second test fixture, the first test fixture is configured to apply a thermal load supplied by the first fluid having the first temperature to the second test object, and wherein, when the first surface of the second test object is coupled to the first interface surface of the first test fixture and the second surface of the second test object is coupled to the second interface surface of the second test fixture, at least one of the first test fixture and the second test fixture is configured to apply a tensile load or a compressive load to the second test object.

* * * * *